Nov. 10, 1959 — A. VER PLOEG ET AL — 2,912,022
STUMP CUTTING APPARATUS
Filed Aug. 6, 1958 — 2 Sheets-Sheet 1

INVENTORS,
ALONZO VER PLOEG
HARRY VER PLOEG
GARY J VERMEER
BY
Lowell & Henderson
ATTORNEYS

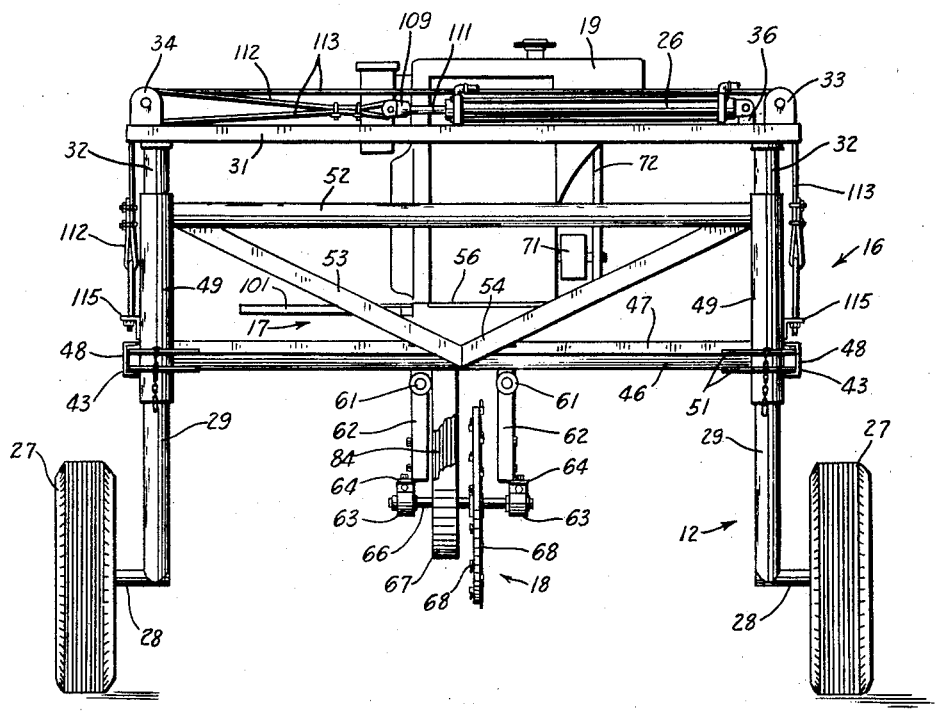
Fig. 4
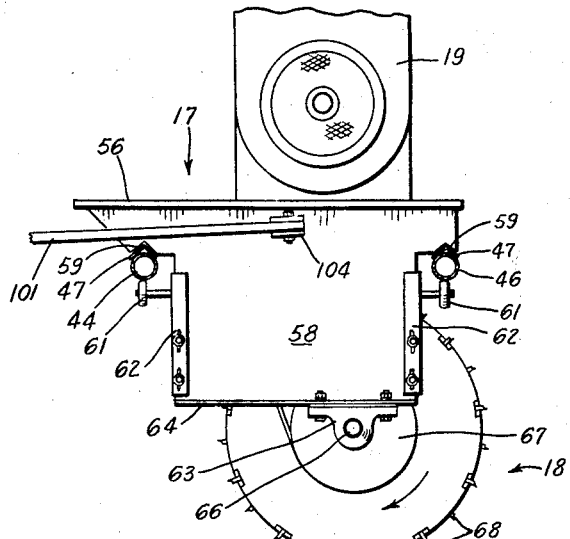
Fig. 5
Fig. 6
Fig. 7
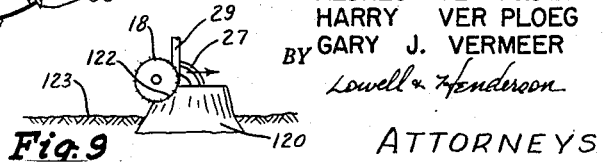
Fig. 8
Fig. 9
INVENTORS,
ALONZO VER PLOEG
HARRY VER PLOEG
BY GARY J. VERMEER
Lowell & Henderson
ATTORNEYS

2,912,022
STUMP CUTTING APPARATUS

Alonzo Ver Ploeg, Harry Ver Ploeg, and Gary J. Vermeer, Pella, Iowa

Application August 6, 1958, Serial No. 753,544

12 Claims. (Cl. 144—2)

This invention relates to a portable cutting device and more particularly to an apparatus for cutting tree stumps or the like, which apparatus includes a wheeled frame adapted for connection to a prime mover, such as a conventional tractor.

It is an object of this invention to provide an improved stump cutting apparatus.

Another object of this invention is to provide a portable stump cutting apparatus adapted for attachment to a prime mover in a towed manner, and wherein the cutting apparatus is self-movable relative to the prime mover when the latter is stationary.

A further object of this invention is to provide a portable stump cutting apparatus adapted for attachment to a prime mover which includes a saw, the arrangement of the apparatus being such that the saw is movable longitudinally, transversely and vertically of the stump and independently of the prime mover.

Another object of this invention is to provide a portable stump cutting apparatus including a wheeled frame and a main frame which is attachable at one end to a prime mover for horizontal movement relative thereto, and attachable at the other end to the wheeled frame for vertical movement relative thereto, and including also a platform device for carrying a cutter blade which device is mounted on said main frame and movable transversely thereof.

A further object of this invention is to provide a portable stump cutting apparatus including structure capable of attaining the objects set forth hereinbefore and wherein the circular saw is disposed in a vertical manner.

Another object of this invention is to provide a portable stump cutting apparatus which is economical to manufacture, rugged in structure, and effective in operation.

These and other objects will become apparent from a consideration of the following description when taken in conjunction with the accompanying drawings, wherein:

Fig. 4 is a rear elevational view of the apparatus, with certain parts deleted and other parts broken away for the purpose of clarity;

Fig. 5 is a fragmentary side elevational view of the apparatus showing the mounting arrangement of the platform device, some parts being shown in section for the purpose of clarity; and Figs. 6, 7, 8 and 9 are reduced diagrammatic illustrations showing the cutting saw of the apparatus in changed positions, as viewed from the rear and the side of the apparatus.

Figures 1, 2, 3:
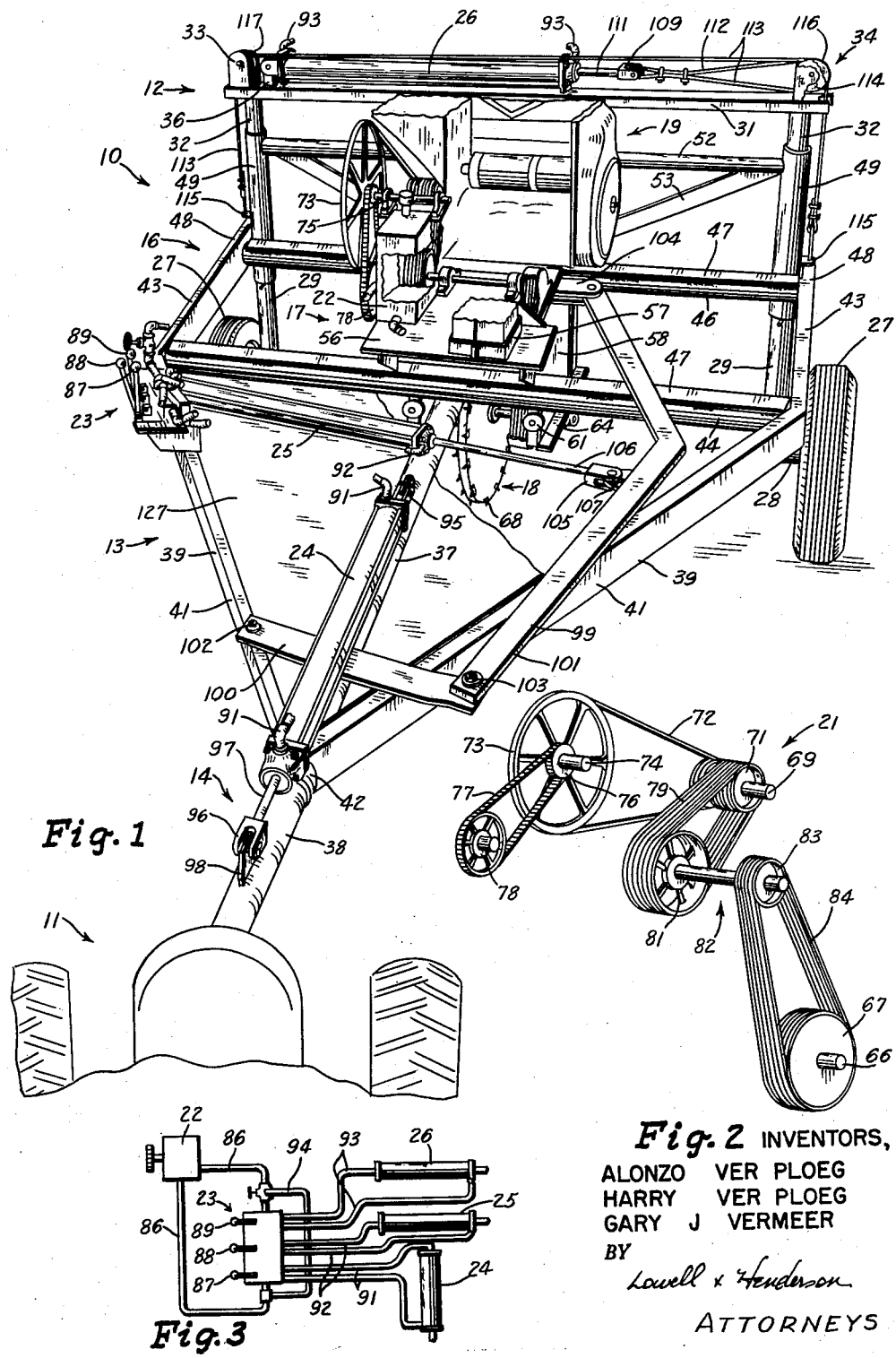
Fig. 1 is a perspective view of a stump cutting apparatus embodying the present invention and shown in assembled relation with a tractor, only the rear portion of which is illustrated, with parts of the apparatus being broken away for the purpose of clarity.
Fig. 2 is a diagrammatic perspective view of the driving mechanism of the apparatus of Fig. 1.
Fig. 3 is a diagrammatic showing of the hydraulic system.

Referring now to the drawings, a portable stump cutter apparatus, indicated generally at 10 in Fig. 1, is adapted for attachment to a prime mover, such as a farm tractor 11. The apparatus 10 includes generally a wheeled frame 12, and a main frame 13 which is pivotally connected at its front end 14 to the tractor 11 and connected at its rear end 16 to the wheeled frame 12 for vertical movement thereon. A platform device 17 is mounted on the main frame 13 for movement transversely thereof and carries a circular saw 18 and a power plant 19. By means of a driving train 21 (Fig. 2), the power plant or engine 19 operates the circular saw 18 and a fluid pump 22, also mounted on the platform device 17.

A control box 23 (Fig. 1), operatively connected with the fluid pump 22, is mounted on one side of the main frame 13 for controlling the operation of three piston and cylinder units 24, 25 and 26. These hydraulic units are operable, either independently of or in combination with each other, to move the combined main frame 13 and wheeled frame 12 in a horizontal manner relative to the tractor 11, to move the rear end 16 of the main frame in a vertical manner relative to the wheeled frame 12, and also to move the platform device 17 transversely of the main frame 13.

The wheeled frame 12 includes a pair of wheels 27 each of which is rotatably mounted on a stub axle 28. A tubular member 29 is secured at one end to each stub axle 28 and is disposed normally in an upright manner. The upper ends 32 of the tubular members 29 are secured to the outer ends of a cross member 31 whereby the members 29 are arranged in a spaced, parallel relation. A pair of pulley units 33 and 34 are mounted at each outer end of the cross member 31, and a pivot mount 36 (Fig. 4) is secured to the cross member 31 adjacent the pulley unit 33.

The main frame 13 includes a tubular center frame member 37 and a tubular extensible member 38 which is telescopically mounted within the center member 37 and adapted for attachment at its outer free end (not shown) in a conventional manner to the rear of the tractor 11. A pair of frame members 39 form the sides of the main frame and include portions 41 which are secured to the front end 42 of the center frame member 37 and which extend outwardly and rearwardly therefrom, and parallel side portions 43 extended rearwardly from the outermost ends of the portions 41. The side portions 43 are connected by a pair of longitudinally spaced, parallel front and rear cross supports 44 and 46, respectively, the length of the supports transversely of the main frame 13 being substantially the same as the length of the cross member 31. An angle iron 47 is secured on top of each cross support 44 and 46 in a manner best shown in Fig. 5, whereby to form a track or guide for a purpose hereinafter described.

A tubular element 49, slightly larger in size but shorter in length than the members 29, is mounted in an upstanding manner at each of the outer ends of the rear cross support 46 by a pair of plates 51 (Fig. 4) secured between the support 46 and the rear end 48 of the side frame portions 43. The elements 49 are connected in transversely spaced relation by a cross brace 52 extended therebetween, and also by an angle brace 53 the apex portion 54 of which depends downwardly and slightly in front of the center of the rear cross support 46.

As viewed in Figs. 1 and 4, the short tubular elements 49 of the main frame 13 are of the proper size and transverse spacing to be telescopically mounted upon the longer tubular members 29 of the wheeled frame 12, whereby the rear end 16 of the main frame 13 is adapted to move vertically on the wheeled frame 12. Additionally, due to the telescopic arrangement of the center frame member 37 and the extensible member 38, the main frame 13 is also adapted for movement relative to and independently of the tractor 11.

The platform device 17 (Fig. 5) comprises a flat, horizontally disposed base plate 56 having a length sufficient to extend longitudinally over and beyond the front and rear cross supports 44 and 46 and having a width sufficient to support the engine 19, the pump 22, and a battery 57 (Fig. 1) for the engine. A side panel 58 depends from each side edge of the base plate 56 and is provided with a pair of longitudinally spaced, inverted V-shaped cut-outs 59 (Fig. 5). The opposite pairs of cut-outs 59 are located so as to fit over the tops of the angle irons 47 secured to the front and rear cross supports 44 and 46, so that the platform device 17 is mountable on and adapted for transverse movement across the main frame 13.

The arrangement of the cut-outs 59 tends to limit any horizontal shaking of the platform device 17, due to operation of the circular saw. To prevent vertical shaking of the device 17, snubbers 61 (Fig. 5) are mounted on angle members 62 which are vertically adjustably secured to the corners of the panels 58. The snubbers are located below and in contacting relation with the front and rear cross supports 44 and 46. A pair of bearing units 63 (Fig. 4) are mounted in transversely opposed relation to horizontally disposed supporting bars 64 secured along the lower edges of each side panel 58. A shaft 66 is rotatably mounted in the units 63 so as to extend therebetween, and carries a belt driven wheel 67 and the circular saw 18 in a side-by-side relation. For the purpose of being capable of cutting either to the left or to the right, as viewed in Fig. 4, the circular saw 18 is provided with blade or cutter members 68 peripherally mounted on each side thereof.

Referring now to Fig. 2, the driving mechanism 21 for the apparatus 10 includes a shaft 69 for imparting engine power to a drive wheel 71. From the wheel 71, a single belt 72 is trained about an idler wheel 73, the shaft 74 of which is rotatably mounted in a unit 75 (Fig. 1) secured to the platform device 17. A sprocket wheel 76, secured to the shaft 74, is connected through a chain belt 77 to a wheel and shaft unit 78 for operating the fluid pump 22.

Also from the drive wheel 71, a series of V belts 79 are trained about one wheel 81 of an idler unit 82, the other wheel 83 of the unit 82 being connected through a series of V belts 84 to the wheel 67 for the circular saw shaft 66. Thus it may be seen that operation of the engine 19 causes operation of both the circular saw 18 and the fluid pump 22.

From the fluid pump 22 (Figs. 1 and 3) hydraulic fluid is transmitted through a supply and return conduit 86 to the control box 23. Three levers 87, 88 and 89 are arranged at the box 23 in a conventional manner to control the flow of the fluid through pairs of conduits 91, 92 and 93 leading from the box to the respective piston and cylinder units 24, 25 and 26. A controlled bypass line 94 may be interposed in the conduit 86 for obvious reasons. Each lever 87, 88 and 89 is a three position lever, in that at a dead center position, the piston of the unit respectively controlled thereby is stationary: whereas, when a lever is moved to either side of the dead center position, the piston moves inwardly or outwardly of the respective cylinder until the lever is returned to the dead center position.

Referring now to Fig. 1, it is noted that the piston and cylinder unit 24 is connected at one end to a mount 95 secured to the center frame member 37 and that the head 96 of the unit's piston rod 97 is connected to a mount 98 which is attached to the extension member 38. Thus, by operating the control box lever 87 to effect reciprocal movement of the piston rod 97, the combined main and wheeled frames 13 and 12, respectively, are movable relative to the tractor 11.

For the purpose of utilizing the piston and cylinder unit 25 for moving the platform device 17 transversely on the main frame 13, a linkage unit 99 (Fig. 1) is provided which includes a front arm 100 and an angular side arm 101. The front arm 100 is pivotally mounted at 102 (Fig. 1) to one frame portion 41 and extends substantially transversely across the frame 13 to where it is connected at 103 to the front end of the side arm 101. The side arm 101 extends angularly (Fig. 1) toward the rear 16 of the frame 13 and has its rear end pivotally mounted to a bracket 104 (Figs. 1 and 4) which is secured to a side of the platform device 17. The piston and cylinder unit 25 is pivotally mounted (not shown) to the same side portion 41 as that to which the front arm 100 is secured but rearwardly thereof (Fig. 1), and extends transversely across the frame 13 substantially parallel to the front arm 100. The head 105 of the piston rod 106 of the unit 25 is pivotally connected to a mount 107 attached to the side arm 101. By the arrangement of the linkage unit 99 in combination with the piston and cylinder unit 25, reciprocal movement of the piston rod 106 causes transverse movement of the platform device 17 on the cross supports 44 and 46 of the main frame 13.

For the purpose of controlling the upward and downward movement of the rear end 16 of the main frame 13 on the wheeled frame tubular members 29, the third piston and cylinder unit 26, which is pivotally mounted at 36 to the wheeled frame cross member 31, is connected through a series of cables to each tubular element 49 of the main frame rear end 16. The head 109 (Fig. 4) of the piston rod 111 of the unit 26 is connected to two cables 112 and 113, the cable 112 being trained over a pulley wheel 114 (Fig. 1), which is part of the double pulley unit 34, and extended downwardly to a connection with a bracket 115 mounted on one of the short tubular elements 49.

The other cable 113 is trained under and over another pulley wheel 116, which is also part of the pulley unit 34, and then extends over the entire length of the cross member 31 (Fig. 4) to a pulley wheel 117 which is part of the opposite pulley unit 33. From the unit 33, the cable 113 extends downwardly and is connected to another bracket 115 mounted on the other short tubular element 49. Thus, it may be seen that by manipulation of the lever 89, the resulting movement of the piston rod head 109 is transmitted directly to both tubular elements 49 of the rear end 16 of the main frame 13, whereby to move these elements in a telescopic manner on the upright tubular members 29 of the wheeled frame 12.

Referring to Figs. 6–9 which show diagrammatically the movement of the circular saw 18 relative to the portable stump cutting apparatus 10 and relative also to a tree stump 120, the operation of the apparatus 10 is as follows. The apparatus 10 is positioned by the tractor 11 to where the saw 18 is adjacent the stump 120 to be cut. The tractor is secured in position by locking its brakes, and the piston and cylinder unit 24 is controlled such that the rod 97 is completely withdrawn whereby the extensible member 38 is within the member 37.

By manipulation of the levers 88 and 89 for the hydraulic units 25 and 26, the circular saw 18 may then be positioned to either side of the stump 120 to provide for the taking of a cut about one inch deep and one inch wide. As viewed in Fig. 6, wherein the apparatus is viewed from the rear as in Fig. 4, the saw 18 shown in dotted lines is positioned to the left of the stump and below the top 121 thereof for taking a cut of a certain depth.

At the end of such cut the cutter 18 is dropped another inch, by operation of the cylinder 26, and moved, by operation of the cylinder 25, transversely of the stump to the other side thereof, after which the cutter is again lowered about an inch and the transverse movement repeated. This procedure is continued until the desired depth of cut at the level 122 is reached as shown in Figs.

6 and 9. The saw is then moved longitudinally of the stump 120 about one inch in the direction indicated by the arrow in Fig. 9, so as to be in position to take a transverse cut on the same level as 122. This movement of the saw is accomplished by manipulation of the lever 87 whereby the piston rod 97 (Fig. 1) moves outwardly of the unit 24. As the tractor 11 is braked in a stationary position, the tubular member 34 is moved rearwardly on the stationary extensible member 38, which movement causes the apparatus 10 to move rearwardly of the tractor 11. This action relocates the saw 18 longitudinally of the prime mover 11 and to the right of the position of the saw as shown in Fig. 9. Alternate one inch longitudinal movements and transverse movements of the cutter 18 relative to the prime mover 11 are continued until the cutter has been moved completely to the rear or to the right of the stump 120 as viewed in Fig. 9. In order to take a second cut at a new level 124, it is then necessary to relocate the saw again to the front or to the left of the stump (Fig. 9). This again is accomplished by manipulating the lever 87 whereby the entire apparatus 10 is moved longitudinally toward the tractor 11.

Assuming the saw is in the position indicated by the dotted lines of Fig. 7, it is progressively dropped in about one inch increments, and transversely moved after each lowering, until the cutting depth indicated at 124 is reached. As for the cut at the level 122, the lowering of the cutter 18 is accomplished by manipulating the lever 89 so as to extend the piston rod 111 outwardly, or to the left as viewed in Fig. 4, of the unit 26, whereby the main frame 13 and the platform device 17 are lowered on the wheeled frame 12 toward the ground level 123. Then, by manipulation of the lever 88, the pistton rod 106 is reciprocally moved relative to the cylinder unit 25 to provide for transverse movement of the cutter 18. With the cutting depth at the level 124 determined, the levers 87 and 88 are alternately manipulated to alternately move the cutter 18 longitudinally and transversely of the prime mover 11, and with the longitudinal movement of the cutter taking place in about one inch increments.

On completion of the second cut at the level 124, the saw 18 is set for a third cut at the level 126 (Fig. 8) and such third cut is determined and taken in all ways similar to the operation described above for the cuts taken at the levels 122 and 124. Of note, the cut 124 leaves the stump at substantially ground level. A feature of the invention is that by the saw 18 being disposed in a vertical manner, the saw, as shown in Fig. 8, is adapted to cut downwardly into the stump 120 to a depth below the level of the ground 123.

In summary, the operation comprises the step of making a series of alternate vertical and transverse movements of the saw to a desired cutting depth followed by alternate longitudinal and transverse movements of the saw to complete a cut on one level over the entire stump. The saw is then retracted longitudinally of the stump or toward the tractor 11, and the above steps repeated. These operational steps are continued until the stump has been cleared away below the level of the ground 123. It is noted that although the transverse cuts may be made in a reciprocal manner, the longitudinal movement of the saw during each series of transverse cuts at a determined cutting level is always away from the tractor 11, due to the particular arrangement of the cutter members 68. Thus, as the saw 18 always rotates clockwise, as indicated by the arrow in Fig. 5, the shavings always fly toward the tractor 11. A cover 127 (Fig. 1) may be extended between the frame member portions 41, and tarps (not shown) may be hung from the portions 41 to trap the shavings, utilized later to fill in the hole left, as by the operation of Fig. 8.

Although a preferred embodiment of the invention has been disclosed herein, modifications and alternate constructions may be made thereto without departing from the full and intended scope of the invention as defined in the appended claims.

We claim:

1. In combination with a prime mover, apparatus for cutting a stump comprising a portable frame unit having a power means mounted thereon, a longitudinally extensible and retractible hitch connection between said portable frame unit and prime mover, a circular cutter operatively connected with said power means and rotatable in a vertical plane extended longitudinally of said prime mover, means movably supporting said cutter on said portable frame unit for transverse and vertical movements relative to said prime mover, and a plurality of fluid-operated units on said frame unit operated from said power means, with one of said fluid-operated units being operatively associated with said hitch connection and the other ones of said fluid-operated units being operatively associated with said cutter supporting means to provide for selective transverse, vertical or longitudinal movements of said cutter relative to said prime mover.

2. In combination with a prime mover, a stump cutter apparatus comprising, a wheeled frame, a main frame having a front end and a rear end, said front end including a pair of elements relatively movable in a direction longitudinally of said main frame one of which is adapted to be pivotally connected to said prime mover, said rear end attached to said wheeled frame for movement in a substantially vertical plane, a platform device mounted on said main frame for movement transversely thereof, circular cutting means rotatably mounted on said platform device, a plurality of fluid operated means operatively connected between said relatively movable elements, between said main frame and said platform device, and between said main frame and said wheeled frame for effecting transverse, vertical and longitudinal movements of said cutting means, and power means mounted on said platform device for operating said circular cutting means and said fluid operated means.

3. In combination with a prime mover, a stump cutter apparatus comprising, a wheeled frame including a pair of transversely spaced wheels, a pair of tubular members each pivotally mounted on a wheel and disposed in a substantially upright manner, and a cross member connected to and extended between said tubular members adjacent the tops thereof, a main frame having a front end and a rear end, said front end including a pair of elements relatively movable in a direction longitudinally of said main frame, one of which is adapted to be pivotally connected to said prime mover, said rear end attached to said tubular members for movement in a substantially vertical plane, a platform device mounted on said main frame for movement transversely thereof, circular cutting means rotatably mounted on said platform device, a plurality of fluid operated units one of which is operatively connected between said relatively movable elements, another between said main frame and said platform device, and a third between said cross member and said main frame for effecting, respectively, longitudinal, transverse and vertical movements of said cutting means, and power means mounted on said platform device for operating said circular cutting means and said fluid operated units.

4. In combination with a prime mover, a stump cutter apparatus comprising, a wheeled frame, a main frame having a front end and a rear end, said front end including a pair of telescopically arranged elements extended longitudinally of said main frame one of which is adapted to be pivotally connected to said prime mover, said rear end attached to said wheeled frame for movement in a substantially vertical plane, a platform device mounted on said main frame for movement transversely thereof, circular cutting means rotatably mounted on said platform device, a plurality of fluid operated units one of which is operatively connected between said telescopically arranged elements, another between said main frame and said platform device, and a third between said main frame and said wheeled frame for effecting, respectively, longitudinal, transverse and vertical movements of said cutting means and power means mounted on said platform device for operating said circular cutting means and said fluid operated units.

5. In combination with a prime mover, a stump cutter apparatus comprising, a wheeled frame, a main frame having a front end and a rear end, said front end including a pair of elements relatively movable in a direction longitudinally of said main frame one of which is adapted to be pivotally connected to said prime mover, said rear end attached to said wheeled frame for movement in a substantially vertical plane, said main frame including further a pair of longitudinally spaced, cross braces extended transversely across said main frame, a platform device mounted on said cross braces for movement transversely of said main frame, circular cutting means rotatably mounted on said platform device, fluid operated means including a plurality of units, one of which is operatively connected between said relatively movable elements, another between said main frame and said platform device, and a third between said main frame and said wheeled frame for effecting, respectively, longitudinal, transverse and vertical movements of said cutting means, and power means mounted on said platform device for operating said circular cutting means and said fluid operated means.

6. In combination with a prime mover, a stump cutter apparatus comprising, a wheeled frame, a main frame having a front end and a rear end, said front end including a pair of elements relatively movable in a direction longitudinally of said main frame one of which is adapted to be pivotally connected to said prime mover, said rear end attached to said wheeled frame for movement in a substantially vertical plane, a platform device mounted on said main frame for relative movement transversely thereof, a circular saw rotatably mounted on said platform device and disposed in a substantially upright manner, a plurality of fluid operated units one of which is operatively connected between said relatively movable elements, another between said main frame and said platform device, and a third between said main frame and said wheeled frame for effecting, respectively, longitudinal, transverse and vertical movements of said saw and power means mounted on said platform device for operating said circular saw and said fluid operated units.

7. In combination with a prime mover, a stump cutter apparatus comprising, a wheeled frame, a main frame having a front end and a rear end, said front end including a pair of elements relatively movable in a direction longitudinally of said main frame one of which is adapted to be pivotally connected to said prime mover, said rear end attached to said wheeled frame for movement in a substantially vertical plane, a platform device mounted on said main frame for movement transversely thereof circular cutting means rotatably mounted on said platform device, fluid operated means including three piston and cylinder units, one of said units connected between said relatively movable elements, another of said units connected between said main frame and said platform device, and the third of said units operatively connected between said main frame and said wheeled frame for effecting, respectively, longitudinal, transverse and vertical movements of said cutting means and power means mounted on said platform device for operating said circular cutting means and said fluid operating means.

8. In combination with a prime mover, a stump cutter apparatus comprising, a wheeled frame including a pair of transversely spaced wheels, a pair of tubular members each pivotally mounted on a wheel and disposed in a substantially upright manner, and a cross member connected to and extended between said tubular members adjacent the tops thereof, a main frame having a front end and a rear end, said front end including a pair of telescopically arranged elements extended longitudinally of said main frame one of which is adapted to be pivotally connected to said prime mover, said rear end attached to said tubular members for movement thereon in a substantially vertical plane, a platform device mounted on said main frame for movement transversely thereof, circular cutting means rotatably mounted on said platform device, a plurality of fluid operated units operatively connected between said telescopically arranged elements, between said main frame and said platform device, and between said main frame and said cross member for effecting, respectively, longitudinal, transverse and vertical movements of said cutting means, and power means mounted on said platform device for operating said circular cutting means and said fluid operated units.

9. In combination with a prime mover, a stump cutter apparatus comprising, a wheeled frame, a main frame having a front end and a rear end, said front end including a pair of telescopically arranged elements extended longitudinally of said main frame one of which is adapted to be pivotally connected to said prime mover, said rear end attached to said wheeled frame for movement thereon in a substantially vertical plane, said main frame including further a pair of longitudinally spaced, cross braces extended transversely across said main frame, a platform device mounted on said cross braces for movement transversely of said main frame, circular cutting means rotatably mounted on said platform device, fluid operated means operatively connected between said telescopically arranged elements, between said main frame and said platform device, and between said main frame and said wheeled frame for effecting, respectively, longitudinal, transverse and vertical movements of said cutting means, and power means mounted on said platform device for operating said circular cutting means and said fluid operated means.

10. In combination with a prime mover, a stump cutter apparatus comprising, a wheeled frame including a pair of transversely spaced wheels, a pair of tubular members each pivotally mounted on a wheel and disposed in a substantially upright manner, and a cross member connected to and extended between said tubular members adjacent the tops thereof, a main frame having a front end and a rear end, said front end including a pair of telescopically arranged elements extended longitudinally of said main frame one of which is adapted to be pivotally connected to said prime mover, said rear end attached to said tubular members for movement thereon in a substantially vertical plane, a platform device mounted on said main frame for movement transversely thereof, a circular saw rotatably mounted on said platform device and disposed in a substantially upright manner, fluid operated means including three piston and cylinder units, one of said units connected between said telescopically arranged elements, another of said units connected between said main frame and said platform device, and the third of said units operatively connected between said main frame and said cross member for effecting, respectively, longitudinal, transverse and vertical movements of said saw, and power means mounted on said platform device for operating said circular saw and said fluid operated means.

11. In combination with a prime mover, a stump cutter apparatus comprising, a wheeled frame including a pair of transversely spaced wheels, a pair of tubular members each pivotally mounted on a wheel and disposed in a substantially upright manner, and a cross member connected to and extended between said tubular members adjacent the tops thereof, a main frame having a front end and a rear end, said front end including a pair of telescopically arranged elements extended longitudinally of said main frame one of which is adapted to be pivotally connected to said prime mover, said rear end attached to said tubular members for movement thereon in a substantially vertical manner, said main frame including further a pair of longitudinally spaced, cross braces extended transversely across said main frame, a platform device mounted on said cross braces and adapted for movement transversely of said main frame, a circular saw rotatably mounted on said platform device at said rear end and disposed therebelow in a substantially upright manner, fluid operated means including three independently operable piston and cylinder units, one of said units connected between said telescopically arranged elements, another of said units connected between said main frame and said platform device, and the third of said units operatively connected between said rear end and said cross member for effecting, respectively, longitudinal, transverse and vertical movements of said saw, and power means mounted on said platform device for operating said circular saw and said fluid operated means.

12. In combination with a prime mover, a stump cutter apparatus comprising a portable frame structure having ground engaging wheels at its rear end and a pair of longitudinally extended telescopically arranged members at its front end, means mounting one of said members on said frame structure, means connecting the other of said members to said prime mover, whereby on extension and retraction of said telescopically arranged members said frame structure is longitudinally moved toward and away from said prime mover, a power driven circular cutter rotatable in a vertical plane, and means movably supporting said cutter on said frame structure for transverse and vertical movements relative to said prime mover.

References Cited in the file of this patent

UNITED STATES PATENTS

| | | |
|---|---|---|
| 1,249,332 | Cline | Dec. 11, 1917 |
| 1,321,044 | Hurd | Nov. 4, 1919 |
| 1,417,425 | Thompson | May 23, 1922 |
| 2,365,408 | Hillyer | Dec. 19, 1944 |
| 2,566,088 | LeTourneau | Aug. 28, 1951 |
| 2,855,008 | Long | Oct. 7, 1958 |